(No Model.) 2 Sheets—Sheet 1.

P. PUTNAM.
SAWING MACHINE.

No. 447,903. Patented Mar. 10, 1891.

Witnesses
Kirkley Hyde.
Frank B. Kenney.

Inventor
Perry Putnam
By H. A. Davis
Attorney (No Model.)  P. PUTNAM.  2 Sheets—Sheet 2.
SAWING MACHINE.
No. 447,903.  Patented Mar. 10, 1891.
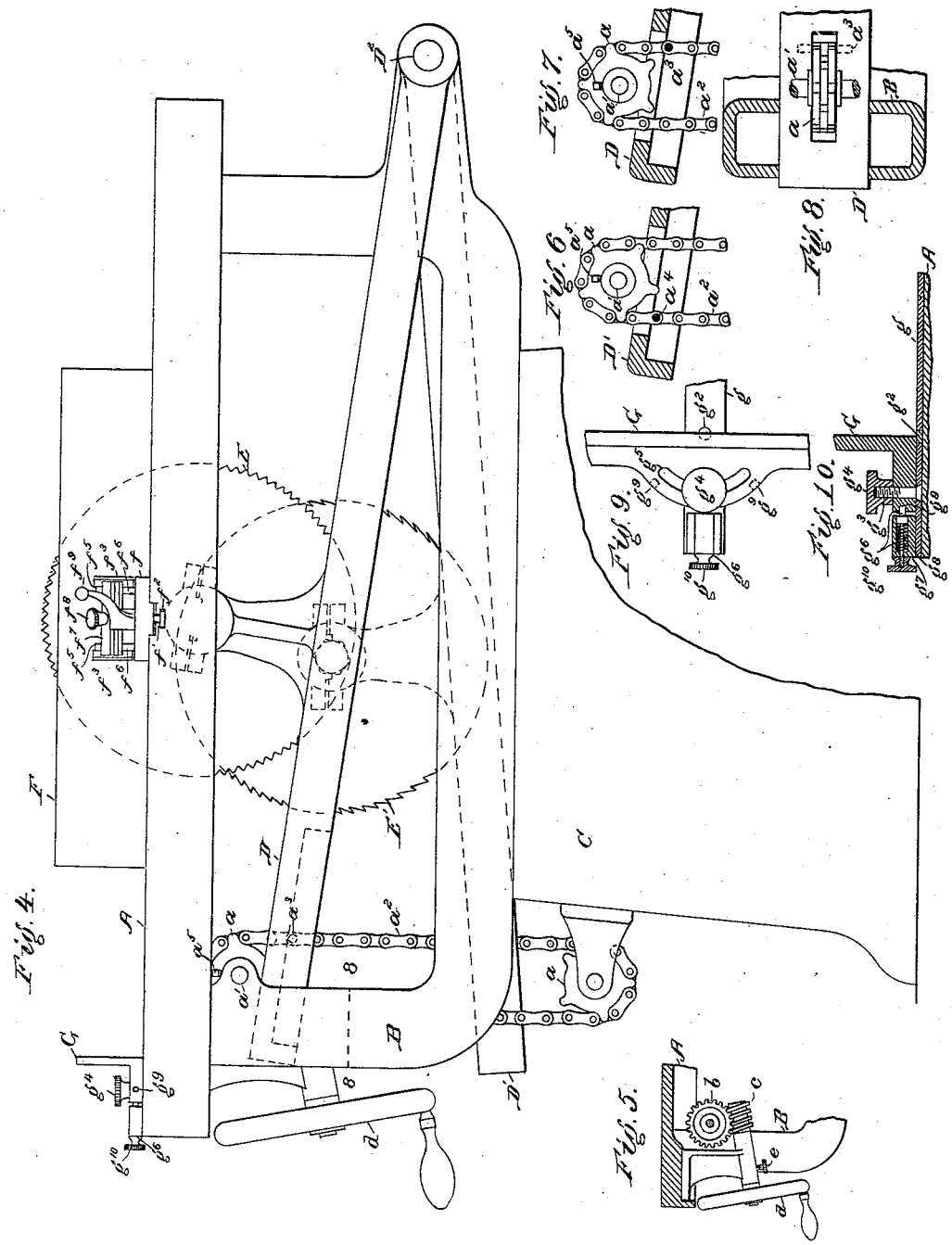

UNITED STATES PATENT OFFICE.

PERRY PUTNAM, OF LOWELL, MASSACHUSETTS, ASSIGNOR TO CHARLES E. GEE, OF SAME PLACE.

SAWING-MACHINE.

SPECIFICATION forming part of Letters Patent No. 447,903, dated March 10, 1891.

Application filed September 27, 1889. Serial No. 325,332. (No model.)

*To all whom it may concern:*

Be it known that I, PERRY PUTNAM, a citizen of the United States, residing at Lowell, in the county of Middlesex and Commonwealth of Massachusetts, have invented a new and useful Improvement in Sawing-Machines, of which the following is a specification.

My invention relates to machine-saw benches in which one or more circular saws operate in conjunction with guide-rests and top surface of a flat table or bench; and the objects of my invention are to provide means for elevating and adjusting the saws, which may be set to insure the possibility of the teeth of but one saw being above the surface of the table, and furnish machines with safer and more convenient mechanism than that heretofore used.

Figure 1:
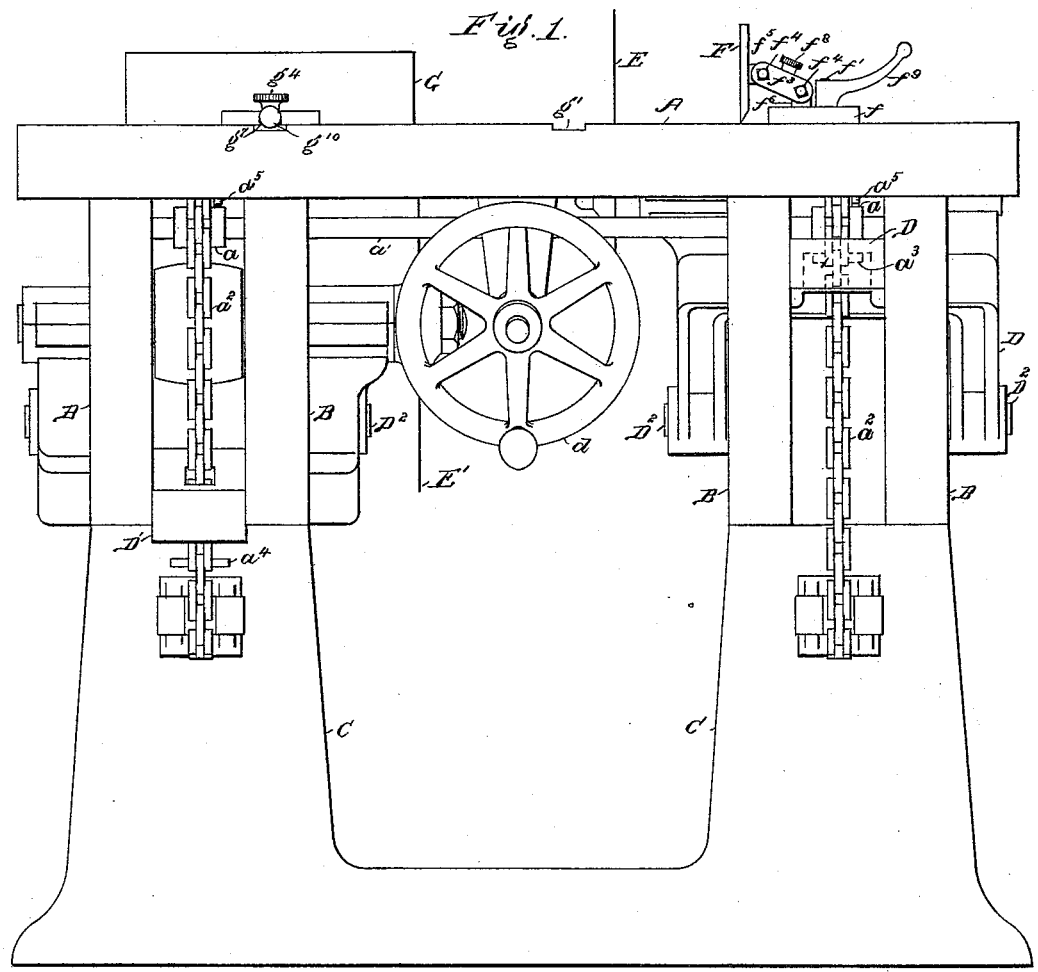
Figure 2:
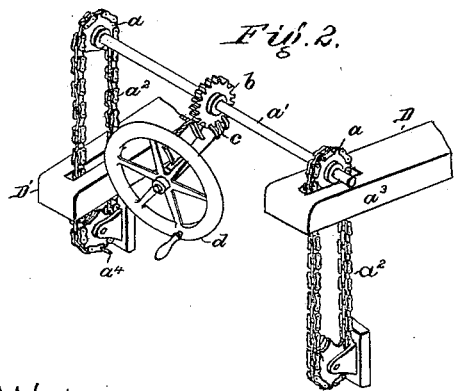
Figure 3:
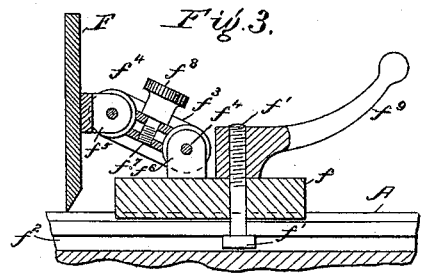

In the accompanying drawings, Figure 1 is a front elevation of the entire machine. Fig. 2 is an isometric view of the device for the vertical adjustment of the saws. Fig. 3 is a sectional elevation of the guide-rest used for gaging thicknesses of lumber to be cut by the splitting-saw. Fig. 4 is a side elevation of the entire machine, a part of the base-casting being broken away. Fig. 5 is a detail of the hand-wheel, worm, and worm-gear. Figs. 6 and 7 are side elevations of the upper sprocket-wheels, chain, and a part of the saw-arbor frames. Fig. 8 is a plan view of the last-named parts and a portion in section on line 8 8 of the frame-casting. Fig. 9 is a plan view, and Fig. 10 is a sectional elevation, of the cutting-off rest.

A is the table or bench upon which the material to be sawed is handled.

B is the frame-work, and C is the base-casting supporting the table.

D and D' are saw-arbor frames, hinged at $D^2$, each carrying bearings, saw-arbors, and the saws, which are usually driven by horizontal belts from a counter-shaft not shown in the drawings, but located in the rear of the machine opposite the hinge $D^2$.

E and E' are circular saws, the periphery of which may project through slots in the table in the usual manner.

So far as described above, the parts named are well known and have long been in common use; but there is danger of accident to the work or to the operators by attempting to use one of the saws before the other is lowered completely below the surface of the table.

In my device I use the sprocket-wheels $a\,a$, upon which are mounted the endless chains $a^2\,a^2$. The upper sprocket-wheels are fastened to the shaft $a'$ by set-screws $a^5$. The worm-wheel $b$ is also fastened to the shaft $a'$, and is revolved in either direction by means of the worm $c$ and hand-wheel $d$. A small milled thumb-screw $e$ may be used to prevent the worm from moving after the saw is adjusted to the required position. Projecting from the chains are the pins $a^3$ and $a^4$. These pins span the slots through which the chain passes in the saw-arbor frames D and D', and the pin $a^3$ lifts the saw E, while the pin $a^4$, being on the opposite side of the other chain, lowers the saw E'. The operation is reversed by turning the hand-wheel $d$ in the opposite direction. The relative position of the pins $a^3$ and $a^4$ may be adjusted, as desired, by loosening the set-screws $a^5$ and revolving either of the upper sprocket-wheels $a$ and again fastening by the set-screws $a^5$. It will readily be seen that the said pins $a^3$ and $a^4$ may be set in this manner, so that it will be impossible for the operator to bring the teeth of one of the circular saws above the surface of the table A without lowering the teeth of the other saw below the surface of the said table A, and as it is usual to have a splitting-saw mounted on one saw-arbor, a cutting-off saw on the other, and frequently change from using one to the other that the quick and safe changing of saws attained by my device is of great importance.

F represents a guide-rest used in connection with either saw, but usually with the splitting-saw. The working-surface of the rest is parallel with the cut made by the saws, and may be set at a vertical right angle with the table A, as it is shown in the drawings, or at different vertical angles. The block $f$ and the head of the bolt $f'$ may slide in a T-groove $f^2$, which is planed in the table A in a line parallel with the axis of the saw-arbors. A pair of links $f^3$, with the bolts or pins $f^4$ and the lugs $f^5$ and $f^6$, which project from the rest F and block $f$, constitute a double hinge, connecting the rest F with the block $f$. A clamp $f^7$, located between the pair of links $f^3$, is fitted to periphery of the arc of the lugs $f^5$ and $f^6$ and grips the said lugs, making the hinge rigid when the clamp is closed by means of the screw $f^8$, and forms an efficient and quickly-operated device for securing the rest F at such different vertical angles as may be required. A handle-nut $f^9$ on the bolt $f'$ enables this entire device to be fastened to the table A at any required distance from the saw.

G represents the cutting-off rest, which is similar in form to a draftsman's T-square. The blade $g$ is fitted to slide free in one or more grooves $g'$, which are planed in the table at a right angle with the axis of the saw-arbors. The rest G is pivoted to its blade $g$ at $g^2$, and clamped to the same by the screw $g^3$ and milled nut $g^4$, a curved slot $g^5$ permitting the rest G to be set at different horizontal angles.

For convenience in setting the rest G for sawing miters, cutting off a right angle, and at any fixed angle which may be frequently required, I make use of a spring-bolt $g^6$, which slides in a chambered lug $g^7$, attached to the blade $g$. A spiral spring $g^8$ impels the bolt toward the rest G in the manner common to spring-bolts. Holes $g^9$ are drilled in the periphery of the circular part of the rest G, and the point of the spring-bolt by entering one of these holes locks the rest accurately at the fixed angle determined by the location of the said hole. A knob $g^{10}$ on the outer end of the spring-bolt enables it to be readily withdrawn from the locking-holes.

Having thus fully described my invention, I claim and desire to secure by Letters Patent—

1. The combination of a saw bench or table with two frames, each hinged to swing in a vertical arc, the said frames carrying saw-arbors with circular saws, the periphery of which may project through slots in the said table, two endless chains mounted on sprocket-wheels, means, substantially such as described, for revolving the said sprocket-wheels, and two pins or studs, one projecting from each of the said endless chains in suitable places to engage with each saw-arbor frame, one at a time, for the purpose of adjusting the relative height of the saw with the surface of the table through which the saw projects.

2. The combination of a hand-wheel, worm-gear, shaft, and two or more sprocket-wheels, with two chains adapted by means of projecting pins in the chains, and set-screws in the sprocket-wheels to be adjusted so as to raise the pin in one chain at the same time that the like pin in the other chain is being lowered, as and for the purpose specified.

PERRY PUTNAM. [L. S.]

Witnesses:
WILLIAM CAREY,
W. F. PUTNAM.